(12) United States Patent
Inagaki

(10) Patent No.: US 7,731,762 B2
(45) Date of Patent: Jun. 8, 2010

(54) DYE COMPOSITION AND DYEING METHOD

(75) Inventor: Yoshio Inagaki, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 1050 days.

(21) Appl. No.: 11/369,866

(22) Filed: Mar. 8, 2006

(65) Prior Publication Data

US 2006/0200918 A1  Sep. 14, 2006

(30) Foreign Application Priority Data

Mar. 9, 2005 (JP) .......................... P.2005-065615
Jul. 19, 2005 (JP) .......................... P.2005-208978

(51) Int. Cl.
*D06P 3/00* (2006.01)
(52) U.S. Cl. ...................... 8/442; 8/456; 8/462; 8/464; 8/550
(58) Field of Classification Search ............ 8/442, 8/456, 462, 464, 550
See application file for complete search history.

(56) References Cited

U.S. PATENT DOCUMENTS 3,667,898 A * 6/1972 Bergman et al. ............... 8/467
2007/0028961 A1 * 2/2007 Zhang et al. ................. 136/263

OTHER PUBLICATIONS

STIC Search Report dated May 11, 2009.*
John S. Wilkes et al., Air and Water Stable 1-Ethyl-3-methylimidazolium Based Ionic Liquids, J. Chem. Soc., Chem. Commun., 1992, 965-967.

* cited by examiner

*Primary Examiner*—Eisa B Elhilo
(74) *Attorney, Agent, or Firm*—Birch, Stewart, Kolasch & Birch, LLP

(57) ABSTRACT

A dye composition is provided and includes a non-aqueous dye and an ionic liquid. A dyeing method is provided and includes a process of applying the dye composition to an object, and a process of removing fluidity of the dye composition.

12 Claims, No Drawings

DYE COMPOSITION AND DYEING METHOD

FIELD OF THE INVENTION

The present invention relates to a dye composition useful as a coating material, and a dyeing method using the same. More specifically, the invention relates to a method of making a non-aqueous solid dye a liquid coating material without using a volatile organic solvent, and dyeing various materials.

BACKGROUND OF THE INVENTION

As a method of dyeing a substance with a non-aqueous dye, a dry dyeing method of precipitating a dye from a gaseous phase to a substance such as vacuum deposition, and a wet dyeing method of precipitating a dye from a liquid phase such as a dye solution and a pigment dispersion to a substance have been used. However, vacuum deposition requires a vacuum apparatus, further, the kinds of dyes that can be proof against a high temperature condition to evaporate dyes are limited in number, so that this method does not necessarily have a wide range of application. On the other hand, the drawback of the liquid phase method is that it is necessary to adopt a measure to reduce environmental load such as the equipments for recovering the vapor of solvent since a volatile organic solvent is used. Even when water is used as the medium, a dispersion process for a long time should be taken to finely disperse a non-aqueous dye in water, further, materials other than a dye such as various surfactants and latex polymers must be added as the auxiliary dispersants, so that this method also does not necessarily have a wide range of application.

On the other hand, a salt called an ionic liquid that is liquid at room temperature was reported by Wilkes et al. in 1992 (e.g., see *Chemical Communications*, p. 965 (1992)). Ionic liquids are incombustible, nonvolatile, can be used safely and repeatedly, and promising in the field of organic synthesis as an environmentally harmonic reactive solvent (e.g., see *Ion-Sei Ekitai—Kaihatsu no Saizensen to Mirai-(Ionic Liquid—The Forefront and the Future of Development-)*, CMC Publishing Co., Ltd. (February, 2003)). In addition, since an ionic liquid has high ionic conductivity, the use in the field of electrochemistry has spread such that the use as the electrolyte of a secondary battery is discussed, and the use as the electrolyte of a dye sensitization solar battery is proposed (e.g., see JP-A-2001-167808 and JP-A-2002-75470).

However, it was not known to apply an ionic liquid to a coating material and a dyeing method.

SUMMARY OF THE INVENTION

An object of an illustrative, non-limiting embodiment of the invention is to provide a method of wet dyeing a substance with a non-aqueous dye without being dispensable of a volatile organic solvent and an auxiliary dispersant such as a surfactant, and another object of an illustrative, non-limiting embodiment of the invention is to provide a dye composition suitable for that use.

The above objects have been achieved by any of the following items (1) to (8).

(1) A dye composition comprising: a non-aqueous dye; and an ionic liquid.

(2) The dye composition as described in the above item (1), wherein the non-aqueous dye is at least one of an azaannulen dye, an azo dye, an anthraquinone dye, a naphthoquinone dye, a xanthene dye, a perylene dye, a flavonoid dye, azomethine dye, a triarylmethane dye and a polymethine dye.

(3) The dye composition as described in the above item (1) or (2), wherein the non-aqueous dye is a salt of a dye cation or a dye anion.

(4) The dye composition as described in the above item (1), wherein the non-aqueous dye is a cyanine dye represented by formula (I):

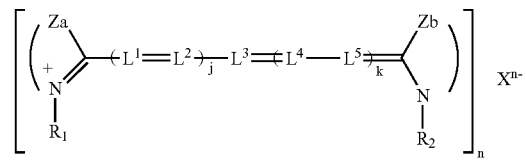

wherein Za and Zb each independently represents an atomic group necessary to form a 5- or 6-membered nitrogen-containing heterocyclic ring; $R_1$ and $R_2$ each independently represents an alkyl group or an aryl group; $L^1, L^2, L^3, L^4$ and $L^5$ each independently represents a substituted or unsubstituted methine group, provided that when there are substituents on $L^1$ to $L^5$, they may be linked to each other to form a ring; j represents 0, 1 or 2; k represents 0 or 1; $X^{n-}$ represents an n-valent anion; and n represents an integer of 1 or more.

(5) The dye composition as described in the above item (1), wherein the non-aqueous dye is an oxonol dye represented by formula (II-1) or (II-2):

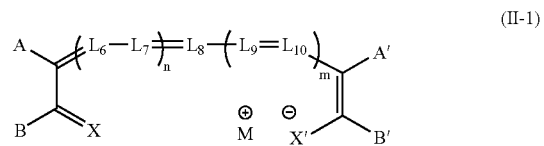

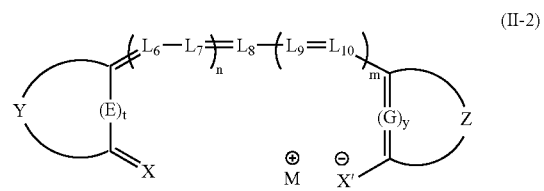

wherein A, A', B and B' each independently represents a substituent; Y and Z each independently represents an atomic group necessary to form a carbon ring or a heterocyclic ring; E and G each independently represents an atomic group to form a conjugated double bond chain; X and X' each independently represents an oxygen atom, a nitrogen atom or $C(CN)_2$; $L_6, L_7, L_8, L_9$ and $L_{10}$ each independently represents a methine group, which may be substituted; $M^+$ represents an onium ion; m and n each independently represents 0, 1 or 2; and t and y each independently represents 0 or 1.

(6) The dye composition as described in any of the above items (1) to (5), wherein the ionic liquid comprises an ion having an aromatic group or a hetero-aromatic group.

(7) The dye composition as described in any of the above items (1) to (5), wherein the ionic liquid is represented by formula (Y-a), (Y-b) or (Y-c):

(Y-a):

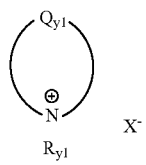

(Y-b): $R_{y1}R_{y2}R_{y3}A_{y1}{}^{1+}X^-$ (Y-c): $R_{y1}R_{y2}N^+=C(NR_{y3}R_{y4})NR_{y5}R_{y6} X^-$ wherein $R_{y1}$ to $R_{y6}$ each independently represents a substituted or unsubstituted alkyl group, or a substituted or unsubstituted alkenyl group; $X^-$ represents an anion for neutralizing electric charge; $Q_{y1}$ represents an atomic group capable of forming a 5- or 6-membered aromatic cation with a nitrogen atom; and $A_{y1}$ represents a nitrogen atom or a phosphorus atom.

(8) A dyeing method comprising: applying a dye composition containing a non-aqueous dye and an ionic liquid as described in any of the above items (1) to (7) to an object, and removing fluidity of the dye composition.

According to a dye composition and dyeing method of the invention, dyeing by application of a non-aqueous dye can be easily performed without using a volatile organic solvent.

DETAILED DESCRIPTION OF THE INVENTION

An exemplary embodiment of the invention will be described in detail below.

Non-aqueous dyes for use in the invention may be organic or inorganic, but the effect is conspicuous in the case of organic dyes relatively low in heat resistance and to which deposition cannot be applied. Examples of the dyes belonging to organic dyes include an azaannulen dye (e.g., phthalocyanines and porphyrins), an azo dye, an anthraquinone dye, a naphthoquinone dye, a xanthene dye, a perylene dye, a flavonoid dye, an azomethine dye, a triarylmethane dye and a polymethine dye (a cyanine dye, a merocyanine dye, an oxonol dye, etc.). As preferred dyes, an azaannulen dye (e.g., phthalocyanines and porphyrins) represented by the following formula (IA), an azo dye represented by the following formula (IB), an anthraquinone dye represented by the following formula (IC), a naphthoquinone dye represented by the following formula (ID), a xanthene dye represented by the following formula (IE), an azomethine dye represented by the following formula (IF), a triarylmethane dye represented by the following formula (IG), and a polymethine dye (a cyanine dye, a merocyanine dye, an oxonol dye, etc.) represented by the following formula (IH) are exemplified. Of these organic dyes, the effect is conspicuous in the case of a polymethine dye that is relatively low in heat resistance, and especially preferred.

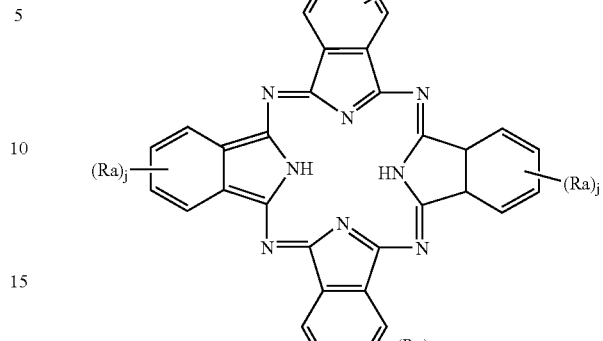

(IA)

In formula (IA), Ra represents a substituent; j represents an integer of from 0 to 4, and when j represents from 2 to 4, a plurality of Ra's may be a different substituent from each other. Of H's of central two NH's, one or two may be substituted with a metal ion.

As the specific examples of the substituents represented by Ra, the substituents exemplified as the examples of the preferred substituents of the alkyl group or the aryl group represented by $R_1$ and $R_2$ described later can be exemplified.

$$Ar_1-N=N-Ar_2(-Rb)_n \qquad (IB)$$

In formula (IB), $Ar_1$ and $Ar_2$ each represents an aromatic ring or a hetero-aromatic ring; Rb represents a hydroxyl group, an amino group, or a 1- or 2-substituted amino group; and n represents an integer of from 1 to 3, and when n is 2 or 3, a plurality of Rb's may be a different substituent from each other.

As the preferred substituents of the 1- or 2-substituted amino group, an alkyl group having from 1 to 18 carbon atoms, an aryl group having from 6 to 18 carbon atoms, and a heterocyclic group having from 1 to 18 carbon atoms are exemplified, and as the examples of the aryl group and the hetero cyclic group, the examples of the aryl group and the heterocyclic group exemplified as the preferred substituents of the alkyl group or the aryl group represented by $R_1$ and $R_2$ described later can be exemplified.

As the specific examples of the aromatic ring or a hetero-aromatic ring represented by $Ar_1$ and $Ar_2$, the examples of the aromatic group among the aryl group and the hetero cyclic group exemplified as the preferred substituents of the alkyl group or the aryl group represented by $R_1$ and $R_2$ described later can be exemplified. $Ar_1$ and $Ar_2$ may have a substituent, and as preferred substituents, an alkyl group having from 1 to 18 carbon atoms, and the substituents exemplified as the examples of the preferred substituents of the alkyl group or the aryl group represented by $R_1$ and $R_2$ described later can be exemplified.

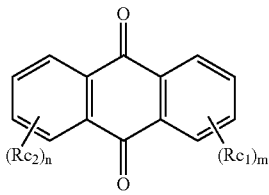
(IC)

In formula (IC), at least one of $Rc_1$ and $Rc_2$ represents a hydroxyl group, an amino group, or a 1- or 2-substituted amino group, and m and n each represents an integer of from 1 to 4. When m is from 2 to 4, a plurality of $Rc_1$'s may be a different substituent from each other. Similarly, when n is from 2 to 4, a plurality of $Rc_2$'s may be a different substituent from each other. Further, the compound may have substituents other than $Rc_1$ and $Rc_2$, and as such substituents, e.g., an alkyl group having from 1 to 18 carbon atoms, and the substituents exemplified as the examples of the preferred substituents of the alkyl group or the aryl group represented by $R_1$ and $R_2$ described later can be exemplified.

As the substituents of the 1- or 2-substituted amino group, the same substituents as the preferred substituents of the 1- or 2-substituted amino group represented by Rb in formula (IB) can be exemplified.

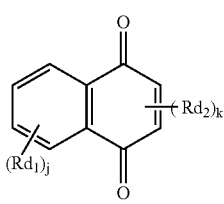
(ID)

In formula (ID), at least one of $Rd_1$ and $Rd_2$ represents a hydroxyl group, an amino group, or a 1- or 2-substituted amino group, j represents from 0 to 4, and k represents from 0 to 2, but j and k do not represent 0 at the same time. Further, the compound may have substituents other than $Rd_1$ and $Rd_2$, and as such substituents, e.g., an alkyl group having from 1 to 18 carbon atoms, and the substituents exemplified as the examples of the preferred substituents of the alkyl group or the aryl group represented by $R_1$ and $R_2$ described later can be exemplified.

As the substituents of the 1- or 2-substituted amino group, the same substituents as the preferred substituents of the 1- or 2-substituted amino group represented by Rb in formula (IB) can be exemplified.

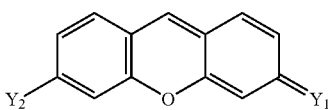
(IE)

In formula (IE), at least one of $Y_1$ and $Y_2$ represents a hydroxyl group, an amino group, a 1- or 2-substituted amino group, or an ammonio group, which may be substituted with an alkyl or aryl group, and the compound may have substituents other than $Y_1$ and $Y_2$. As the substituents other than $Y_1$ and $Y_2$, an alkyl group having from 1 to 18 carbon atoms, and the substituents exemplified as the examples of the preferred substituents of the alkyl group or the aryl group represented by $R_1$ and $R_2$ described later can be exemplified.

As the substituents of the 1- or 2-substituted amino group, the same substituents as the preferred substituents of the 1- or 2-substituted amino group represented by Rb in formula (IB) can be exemplified.

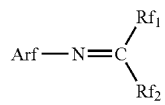
(IF)

In formula (IF), Arf represents an aryl group having at least one group selected from a hydroxyl group, an amino group, or 1- or 2-substituted amino group; at least one of $Rf_1$ and $Rf_2$ represents —C(=O)—$Rf_3$, —CN, —$SO_2$—$Rf_5$, or —C(=N)—$Rf_5$; and $Rf_3$, $Rf_4$ and $Ff_5$ represent an alkyl group (an alkyl group having from 1 to 18 carbon atoms, e.g., methyl, ethyl, propyl, butyl, t-butyl, octyl, dodecyl), an alkoxyl group (an alkoxyl group having from 1 to 18 carbon atoms, e.g., methoxy, ethoxy, 2-propoxy, butoxy, decyloxy), an aryloxy group (an aryloxy group having from 6 to 18 carbon atoms, e.g., phenoxy, 2-naphthoxy, 4-chlorophenoxy, 4-octyloxyphenoxy), an alkylamino group (an alkylamino group having from 1 to 18 carbon atoms, e.g., methylamino, ethylamino, dimethylamino, octyl-amino), or an arylamino group (an arylamino group having from 6 to 18 carbon atoms, e.g., phenylamino, 4-chlorophenylamino, 2-methylphenylamino), and $Rf_1$ and $Rf_2$ may be linked to each other to form a ring.

As the substituents of the 1- or 2-substituted amino group, the same substituents as the preferred substituents of the 1- or 2-substituted amino group represented by Rb in formula (IB) can be exemplified.

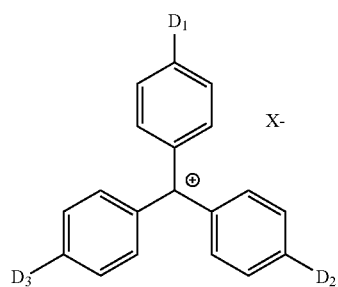
(IG)

In formula (IG), $D_1$, $D_2$ and $D_3$ each a hydroxyl group, an amino group, or a 1- or 2-substituted amino group; $X^-$ represents an anion for neutralizing electric charge, and $X^-$ may be linked to the counter cation to form an inner salt. The compound may have substituents other than $D_1$, $D_2$ and $D_3$. As the substituents other than $D_1$, $D_2$ and $D_3$, an alkyl group having from 1 to 18 carbon atoms, and the substituents exemplified as the examples of the preferred substituents of the alkyl group or the aryl group represented by $R_1$ and $R_2$ described later can be exemplified.

As the substituents of the 1- or 2-substituted amino group, the same substituents as the preferred substituents of the 1- or 2-substituted amino group represented by Rb in formula (IB) can be exemplified.

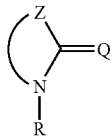
(IH)

In formula (IH), Z represents an oxygen atom, a sulfur atom, a nitrogen atom, which may be substituted, a carbon atom which may be substituted, for forming a 5- or 6-membered ring; Q represents a substituted methine group for forming a polymethine dye; and R represents an alkyl group (an alkyl group having from 1 to 18 carbon atoms, e.g., methyl, ethyl, propyl, butyl, t-butyl, octyl, dodecyl), an alkenyl group (an alkenyl group having from 2 to 18 carbon atoms, e.g., vinyl, allyl, 2-propenyl), or an aryl group (an aryl group having from 6 to 18 carbon atoms, e.g., phenyl, 1-naphthyl), and when the structure forms an ion, a counter ion for neutralizing electric charge may be present.

A cyanine dye represented by the following formula (I), an oxonol dye represented by the later-described formula (II-1) or (II-2) are preferred.

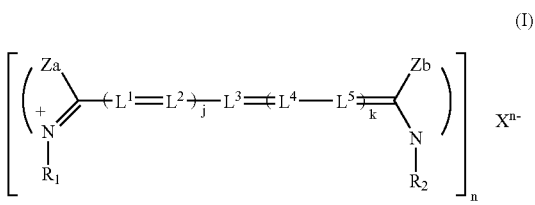
(I)

In formula (I), Za and Zb each represents an atomic group necessary to complete a 5- or 6-membered nitrogen-containing heterocyclic ring; $R_1$ and $R_2$ each represents an alkyl group or an aryl group; $L^1$, $L^2$, $L^3$, $L^4$ and $L^5$ each represents a substituted or unsubstituted methine group, provided that when there are substituents on $L^1$ to $L^5$, they may be linked to each other to form a ring; j represents 0, 1 or 2; k represents 0 or 1; $X^{n-}$ represents an n-valent anion; and n represents an integer of 1 or more.

As the 5- or 6-membered nitrogen-containing heterocyclic ring (nucleus) containing Za and Zb, e.g., a thiazole nucleus, a benzothiazole nucleus, a naphthothiazole nucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a selenazoline nucleus, a tellurazole nucleus, a benzotellurazole nucleus, a naphthotellurazole nucleus, a tellurazoline nucleus, an imidazole nucleus, a benzimidazole nucleus, a naphthoimidazole nucleus, a pyridine nucleus, a quinoline nucleus, an isoquinoline nucleus, an imidazo-[4,5-b]quinoxaline nucleus, an oxadiazole nucleus, a thiadiazole nucleus, a tetrazole nucleus, and a pyrimidine nucleus can be exemplified. Of these nuclei, a benzothiazole nucleus, an imidazole nucleus, a naphthoimidazole nucleus, a quinoline nucleus, an isoquinoline nucleus, an imidazo-[4,5-b]quinoxaline nucleus, a thiadiazole nucleus, a tetrazole nucleus, and a pyrimidine nucleus are preferred. Further, a benzene ring and a naphthoquinone ring may be condensed with these rings.

The 5- or 6-membered nitrogen-containing heterocyclic ring may have a substituent. As the examples of the preferred substituents (atoms), a halogen atom and a substituted or unsubstituted alkyl group and aryl group can be exemplified. As the halogen atoms, a chlorine atom is preferred. As the alkyl group, a straight chain alkyl group having from 1 to 6 carbon atoms is preferred. As the examples of the substituents of the alkyl group, an alkoxyl group (e.g., methoxy), and an alkylthio group (e.g., methylthio) can be exemplified. As the aryl group, a phenyl group is preferred.

The alkyl group represented by $R_1$ and $R_2$ may have a substituent, and the alkyl group is preferably a straight chain, cyclic or branched alkyl group having from 1 to 18 carbon atoms (more preferably from 1 to 8, and especially preferably from 1 to 6). The aryl group represented by $R_1$ and $R_2$ may have a substituent, and the aryl group is preferably an aryl group having from 6 to 18 carbon atoms.

As the examples of the preferred substituents of the alkyl group or the aryl group represented by $R_1$ and $R_2$, the following groups can be exemplified, e.g., a substituted or unsubstituted aryl group having from 6 to 18 carbon atoms (e.g., phenyl, chlorophenyl, anisyl, toluyl, 2,4-di-t-amyl, 1-naphthyl), an alkenyl group (e.g., vinyl, 2-methylvinyl), an alkynyl group (e.g., ethynyl, 2-methylethynyl, 2-phenyl -ethynyl), a halogen atom (e.g., F, Cl, Br, I), a cyano group, a hydroxyl group, a carboxyl group, an acyl group (e.g., acetyl, benzoyl, salicyloyl, pivaloyl), an alkoxyl group (e.g., methoxy, butoxy, cyclohexyloxy), an aryloxy group (e.g., phenoxy, 1-naphthoxy), an alkylthio group (e.g., methylthio, butylthio, benzylthio, 3-methoxypropylthio), an arylthio group (e.g., phenylthio, 4-chlorophenylthio), an alkyl-sulfonyl group (e.g., methanesulfonyl, butanesulfonyl), an arylsulfonyl group (e.g., benzenesulfonyl, paratoluene-sulfonyl), a carbamoyl group having from 1 to 10 carbon atoms, an amido group having from 1 to 10 carbon atoms, an acyloxy group having from 2 to 10 carbon atoms, an alkoxycarbonyl group having from 2 to 10 carbon atoms, a heterocyclic group (e.g., a heterocyclic aromatic ring, e.g., pyridyl, thienyl, furyl, thiazolyl, imidazolyl, and pyrazolyl, and an aliphatic heterocyclic ring, e.g., a pyrrolidine ring, a piperidine ring, a morpholine ring, a pyran ring, a thiopyran ring, a dioxane ring, a dithiolan ring).

In the invention, $R_1$ and $R_2$ each is preferably a straight chain alkyl group having from 1 to 8 (preferably from 1 to 6, and especially preferably from 1 to 4) carbon atoms substituted with an unsubstituted straight chain alkyl group having from 1 to 8 (preferably from 1 to 6, and especially preferably from 1 to 4) carbon atoms, or an alkoxyl group (especially methoxy), or an alkylthio group (especially methylthio).

The methine group represented by $L_1$ to $L_5$ may have a substituent. As the examples of the preferred substituents, an alkyl group having from 1 to 18 carbon atoms, an aralkyl group, and the substituents exemplified as the examples of the preferred substituents of the alkyl group or the aryl group represented by $R_1$ and $R_2$ described above can be exemplified. Of these substituents, an alkyl group (e.g., methyl), an aryl group (e.g., phenyl), a halogen atom (e.g., Cl, Br), and an aralkyl group (e.g., benzyl) are preferred, and a methyl group is especially preferred. In the invention, the case where j represents 2 and k represents 0, or the case where j and k each represents 0 or 1 is preferred.

The substituents on $L^1$ to $L^5$ may be linked to each other to form a ring, preferably a 5- or 6-membered ring, and two or more these rings may be condensed. The linking positions vary by the number of methine chains to be formed. For example, when the methine chain formed by $L^1$ to $L^5$ is a pentamethine chain, the preferred linking positions are $L^1$ and $L^3$, $L^2$ and $L^4$, and $L^3$ and $L^5$. Further, when a condensed double ring is formed, the linking positions are $L^1$, $L^3$ and $L^5$.

In this case, $L^1$ and $R_1$, $L^5$ and $R_2$, and $L^3$ and $R_2$ may be respectively linked to form a ring, preferably a 5- or 6-membered ring. In the invention, a ring formed by the substituents on $L^1$ to $L^5$ is preferably a cyclohexene ring.

In formula (I), $X^{n-}$ represents an n-valent anion, e.g., a halide ion, a perchlorate ion, an isocyanate ion, an isothiocyanate ion, $BF_4^-$, $PF_6^-$, an aliphatic sulfonate ion, and an aromatic sulfonate ion are exemplified. $X^{n-}$ preferably represents an aromatic disulfonate ion or an aromatic trisulfonate ion. $X^{n-}$ more preferably represents a benzene-1,3-disulfonate ion, a 3,3'-biphenyldisulfonate ion, a naphthalene-1,5-disulfonate ion, a naphthalene-1,6-disulfonate ion, a naphthalene-2,6-disulfonate ion, a 1-methylnaphthalene-2,6-disulfonate ion, a naphthalene-2,7-disulfonate ion, a naphthalene-2,8-disulfonate ion, a 2-naphthol-6,8-disulfonate ion, a 1,8-dihydroxynaphthalene-3,6-disulfonate ion, or a 1,5-dihydroxynaphthalene-2,6-disulfonate ion, especially preferably represents a naphthalene-1,5-disulfonate ion, a naphthalene-1,6-disulfonate ion, a naphthalene-2,6-disulfonate ion, a 1-methylnaphthalene-2,6-disulfonate ion, a naphthalene-2,7-disulfonate ion, or a naphthalene-2,8-disulfonate ion, and most preferably represents a naphthalene-1,5-disulfonate ion.

Oxonol dyes represented by the following formula (II-1) or (II-2) are described in detail below.

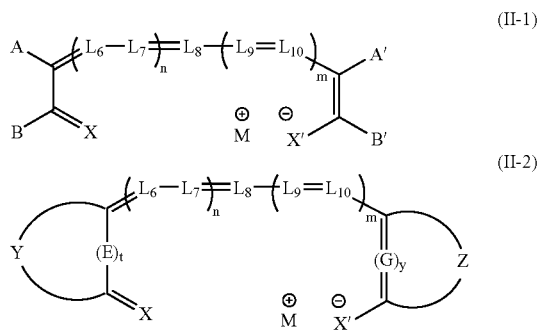

In formulae (II-1) and (II-2), A, A', B and B' each represents a substituent; Y and Z each represents an atomic group necessary to form a carbon ring or a heterocyclic ring; E and G each represents an atomic group to complete a conjugated double bonded chain; X and X' each represents an oxygen atom, a nitrogen atom or $C(CN)_2$; $L_6, L_7, L_8, L_9$ and $L_{10}$ each represents a methine group which may be substituted; $M^+$ represents an onium ion; m and n each represents 0, 1 or 2; and t and y each represents 0 or 1.

As the substituents represented by A, A', B and B', e.g., a substituted or unsubstituted straight chain, branched chain or cyclic alkyl group having from 1 to 18, preferably from 1 to 8, carbon atoms (e.g., methyl, ethyl, propyl, isopropyl, n-butyl, isobutyl, sec-butyl, t-butyl, cyclohexyl, methoxy-ethyl, ethoxycarbonylethyl, cyanoethyl, diethylaminoethyl, hydroxyethyl, chloroethyl, acetoxyethyl, etc.), a substituted or unsubstituted aralkyl group having from 7 to 18, preferably from 7 to 12, carbon atoms (e.g., benzyl, carboxybenzyl, etc.), an alkenyl group having from 2 to 18, preferably from 2 to 8, carbon atoms (e.g., vinyl, etc.), an alkynyl group having from 2 to 18, preferably from 2 to 8, carbon atoms (e.g., ethynyl, etc.), a substituted or unsubstituted aryl group having from 6 to 18, preferably from 6 to 10, carbon atoms (e.g., phenyl, 4-methylphenyl, 4-methoxyphenyl, 4-carboxyphenyl, 3,5-dicarboxyphenyl, etc.), a substituted or unsubstituted acyl group having from 2 to 18, preferably from 2 to 8, carbon atoms (e.g., acetyl, propionyl, butanoyl, chloroacetyl, etc.), a substituted or unsubstituted sulfonyl group having from 1 to 18, preferably from 1 to 8, carbon atoms (e.g., methanesulfonyl, p-toluenesulfonyl, etc.), a sulfinyl group having from 1 to 18, preferably from 1 to 8, carbon atoms (e.g., methanesulfinyl, ethanesulfinyl, octanesulfinyl, etc.), an alkoxycarbonyl group having from 2 to 18, preferably from 2 to 8, carbon atoms (e.g., methoxycarbonyl, ethoxycarbonyl, etc.), an aryloxy-carbonyl group having from 7 to 18, preferably from 7 to 12, carbon atoms (e.g., phenoxycarbonyl, 4-methylphenoxycarbonyl, 4-methoxyphenylcarbonyl, etc.), a substituted or unsubstituted alkoxyl group having from 1 to 18, preferably from 1 to 8, carbon atoms (e.g., methoxy, ethoxy, n-butoxy, methoxyethoxy, etc.), a substituted or unsubstituted aryloxy group having from 6 to 18, preferably from 6 to 10, carbon atoms (e.g., phenoxy, 4-methoxyphenoxy, etc.), an alkylthio group having from 1 to 18, preferably from 1 to 8, carbon atoms (e.g., methylthio, ethylthio, etc.), an arylthio group having from 6 to 10 carbon atoms (e.g., phenylthio, etc.), a substituted or unsubstituted acyloxy group having from 2 to 18, preferably from 2 to 8, carbon atoms (e.g., acetoxy, ethylcarbonyloxy, cyclohexylcarbonyloxy, benzoyloxy, chloroacetyloxy, etc.), a substituted or unsubstituted sulfonyloxy group having from 1 to 18, preferably from 1 to 8, carbon atoms (e.g., methane-sulfonyloxy, etc.), a carbamoyloxy group having from 2 to 18, preferably from 2 to 8, carbon atoms (e.g., methylcarbamoyloxy, diethylcarbamoyloxy, etc.), a substituted or unsubstituted amino group having from 0 to 18, preferably from 0 to 8, carbon atoms (e.g., unsubstituted amino, methylamino, dimethylamino, diethylamino, anilino, methoxyphenylamino, chlorophenylamino, morpholino, piperidino, pyrrolidino, pyridylamino, methoxy-carbonylamino, n-butoxycarbonylamino, phenoxycarbonylamino, methylcarbamoylamino, phenylcarbamoylamino, ethylcarbamoyl-amino, methylsulfamoylamino, phenylsulfamoylamino, acetylamino, ethylcarbonylamino, ethylthiocarbonylamino, cyclohexylcarbonylamino, benzoylamino, chloroacetylamino, methanesulfonylamino, benzenesulfonylamino, etc.), a substituted or unsubstituted carbamoyl group having from 1 to 18, preferably from 1 to 8, carbon atoms (e.g., unsubstituted carbamoyl, methylcarbamoyl, ethylcarbamoyl, n-butylcarbamoyl, t-butylcarbamoyl, dimethylcarbamoyl, morpholinocarbamoyl, pyrrolidinocarbamoyl, etc.), a substituted or unsubstituted sulfamoyl group having from 0 to 18, preferably from 0 to 8, carbon atoms (e.g., sulfamoyl, methylsulfamoyl, phenyl-sulfamoyl, etc.), a halogen atom (e.g., fluorine, chlorine, bromine, etc.), a hydroxyl group, a nitro group, a cyano group, a carboxyl group, and a heterocyclic group (e.g., oxazole, benzoxazole, thiazole, benzothiazole, imidazole, benz-imidazole, indolenine, pyridine, sulforan, furan, thiophene, pyrazole, pyrrole, chroman, coumarin, etc.) can be exemplified.

In formula (II-1), as the substituents represented by A, A', B and B', the same substituents as the substituents exemplified as the substituents of the nitrogen-containing heterocyclic ring in formula (I) can be exemplified.

The preferred substituents represented by A and A' are the substituents having the σp value of Hammett's substitution constant of 0.2 or more. Hammett's substitution constant is described, e.g., in *Chem. Rev.*, 91, 165 (1991). As the especially preferred substituents, a cyano group, a nitro group, an alkoxycarbonyl group, an acyl group, a carbamoyl group, a sulfamoyl group, and a sulfonyl group can be exemplified.

The preferred substituents represented by B and B' are an alkyl group, an aryl group, an alkoxyl group and an amino group.

In formula (II-2), —C-(E)$_t$-C(=X)— bonded to Y, and —C=(G)$_y$=C(—X')— bonded to Z are respectively in conjugation state, accordingly Y and a carbon ring or a heterocyclic ring represented by —C-(E)$_t$—C(=X)— bonded to Y, and Z and a carbon ring or a heterocyclic ring represented by —C=(G)$_y$=C(—X')— bonded to Z are respectively thought as one of resonance structures. Therefore, for convenience's sake, Y and Z, and a carbon ring or a heterocyclic ring represented by —C-[(E)$_t$ and (G)$_y$]-C(=X and X')— bonded to Y and Z will be described below. As the Y and Z, and a carbon ring or a heterocyclic ring represented by —C-[(E)$_t$ and (G)$_y$]-C(=X and X')— bonded to Y and Z, a 4-, 5-, 6- or 7-membered ring is preferred, and a 5- or 6-membered ring is especially preferred. These rings may further form a condensed ring with other 4-, 5-, 6- or 7-membered ring, and these rings may have a substituent. As the substituents, the substituents represented by A, A', B and B' exemplified above are exemplified. As hetero atoms to form a heterocyclic ring, B, N, O, S, Se and Te are preferred, and N, O and S are especially preferred. t and y each represents 0 or 1, and preferably 0.

In formulae (II-1) and (II-2), X and X' each represents oxygen, nitrogen or C(CN)$_2$, and preferably oxygen.

In formula (II-2), as a carbon ring formed by Y and Z, and —C-[(E)$_t$ and (G)$_y$]-C(=X and X')— bonded to Y and Z, the carbon rings represented by the following formulae (A-1) to (A-4) are exemplified. Of these carbon rings, (A-1) and (A-4) are preferred.

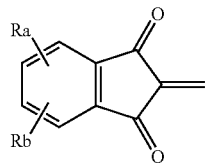

A-1

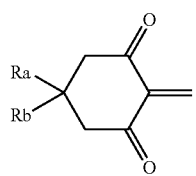

A-2

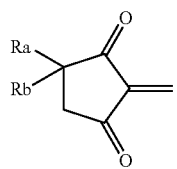

A-3

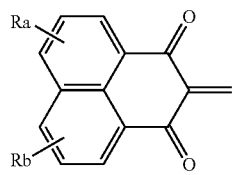

A-4

As a heterocyclic ring formed by Y and Z, and —C-[(E)$_t$ and (G)$_y$]-C(=X and X')— bonded to Y and Z, the heterocyclic rings represented by the following formulae (A-5) to (A-41) are exemplified.

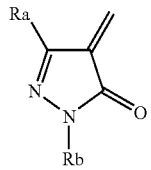

A-5

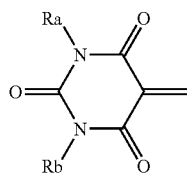

A-6

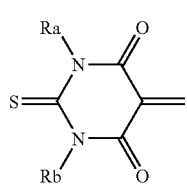

A-7

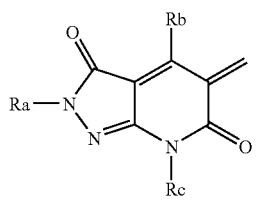

A-8

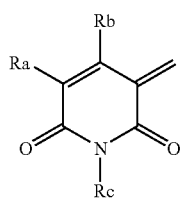

A-9

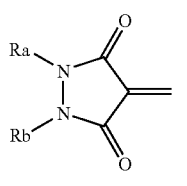

A-10

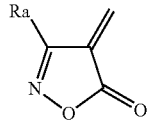

A-11

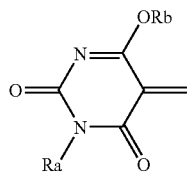

A-12

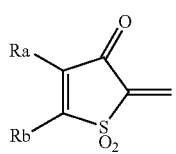

A-13

-continued
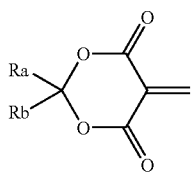 A-14
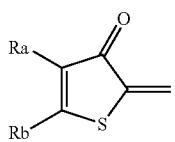 A-15
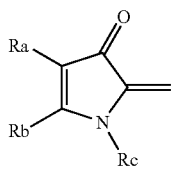 A-16
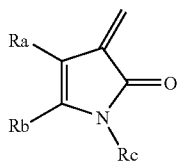 A-17
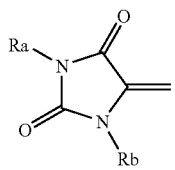 A-18
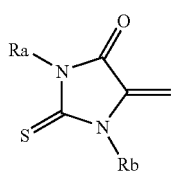 A-19
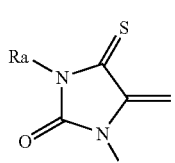 A-20
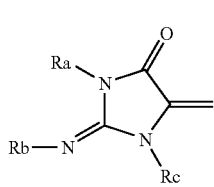 A-21
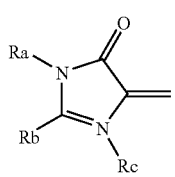 A-22
-continued
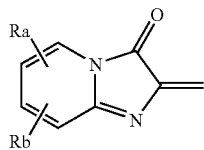 A-23
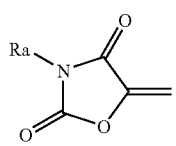 A-24
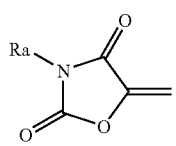 A-25
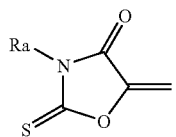 A-26
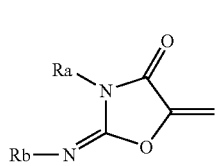 A-27
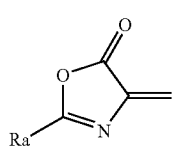 A-28
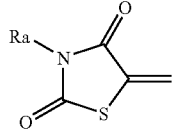 A-29
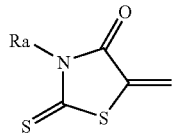 A-30
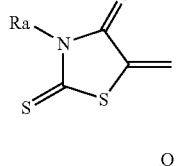 A-31
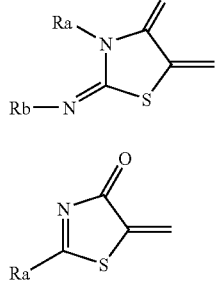 A-32

-continued

A-33 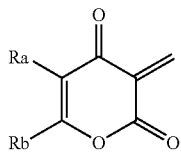

A-34 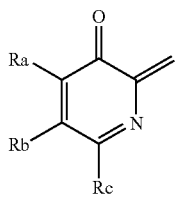

A-35 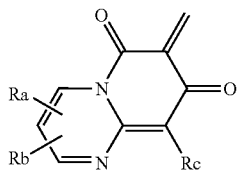

A-36 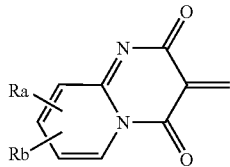

A-37 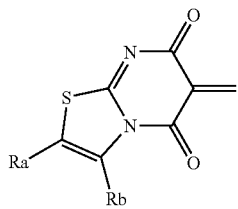

A-38 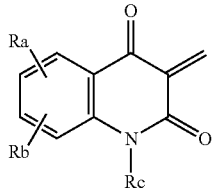

A-39 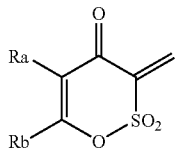

A-40 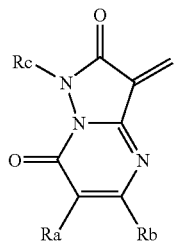

A-41 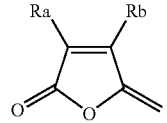

The preferred heterocyclic rings are (A-5), (A-6) and (A-7). Ra, Rb and Rc each represents a hydrogen atom or a substituent.

As the substituents represented by Ra, Rb and Rc, the same substituents as the substituents represented by A, A', B and B' can be exemplified.

The methine groups represented by $L_6$, $L_7$, $L_8$, $L_9$ and $L_{10}$ may be the same or different, which are substituted or unsubstituted methine groups, and the same substituents as the substituents represented by A, A', B and B' can be exemplified.

These polymethine dyes are described, e.g., in F. M. Hamer, *The Cyanine Dyes and Related Compounds* 5, on and after pp. 55, Interscience and Publishers, New York (1964); Nikolai Tyutyulkov, Jurgen Fabian, Achim Ulehihorn, Fritz Dietz, and Alia Tadjer, *Polymethine Dyes*, pp. 23 to 38, St. Kliment Ohridski University Press, Sophia; D. M. Sturmer, *Heterocyclic Compounds—Special topics in heterocyclic chemistry*, Chapter 18, Clause 14, pp. 482 to 515, John Wiley & Sons, New York, London (1977); and *Rodd's Chemistry of Carbon Compounds*, $2^{nd}$ Ed., Vol. IV, Part B, Chapter 15, pp. 369 to 422 (1977), $2^{nd}$ Ed., Vol. IV, Part B, Chapter 15, pp. 267 to 296 (1985), Elsevier Science Public Company Inc., New York.

The specific examples of the dyes S-1 to S-8 for use in the composition of the invention are shown below, but it should not be construed that the invention is limited thereto.

S-1

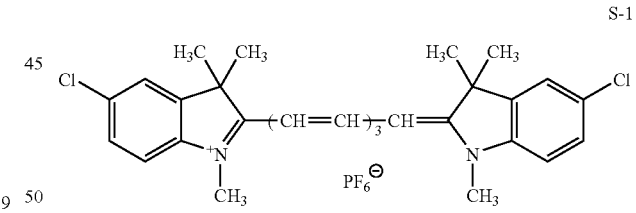

S-2

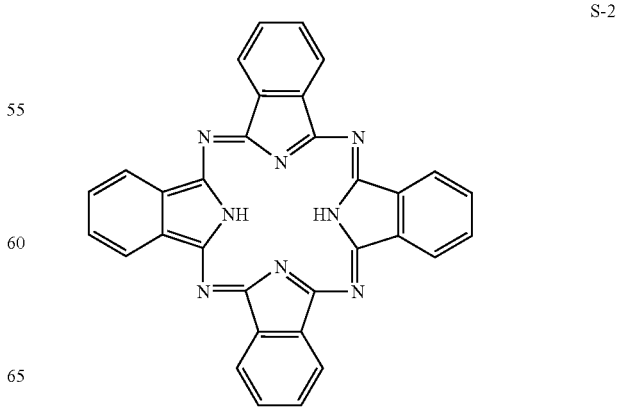

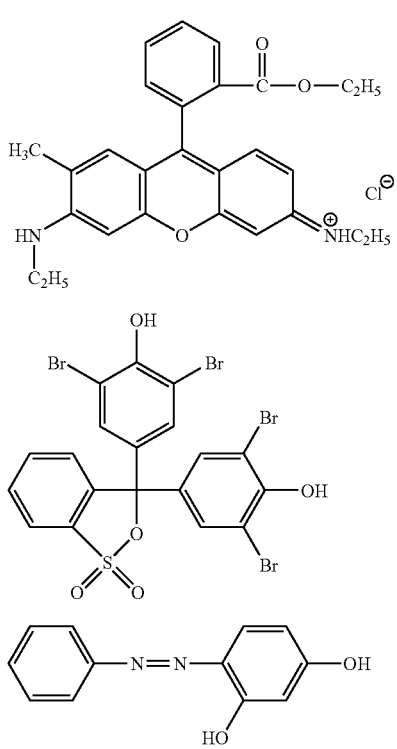

The ionic liquids for use in the invention are liquid salts at room temperature, which have been recognized as ionic liquids since J. S. Wilkes and M. J. Zaworotko reported on *Chemical Communications*, p. 965 (1992), and sometimes called normal temperature molten salt or low temperature molten salt. Such ionic liquids are synthesized by various combinations of anions and cations, and those commercially available as reagents are described, e.g., in Takayoshi Suga, *Ion-Sei Ekitai* (*Ionic Liquids*), compiled by Hiroyuki Ohno, Chapter 2-4, pp. 25 to 34, CMC Publishing Co., Ltd. (February, 2003). In this literature are solely exemplified ionic liquids having a cationic part of an imidazolium skeleton or a pyridinium skeleton. However, as the ionic liquids having an aliphatic-based cationic part, e.g., N,N,N-trimethyl-N-propylammonium bis(trifluoromethanesulfonyl)imide, N-methyl-N-propyl-piperidinium bis(trifluoromethanesulfonyl)imide, N,N-diethyl-N-methyl-(2-methoxyethyl)ammonium tetrafluoroborate, and N,N-diethyl-N-methyl-(2-methoxyethyl)ammonium bis(trifluoromethanesulfonyl)imiden are exemplified, but the invention is not limited thereto.

As preferred examples of ionic liquids, the compounds represented by the following formula (Y-a), (Y-b) or (Y-c) are exemplified.

(Y-a):

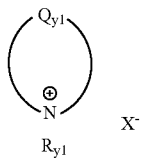

(Y-b): $R_{y1}R_{y2}R_{y3}A_{y1}^{+}X^{-}$ (Y-c): $R_{y1}R_{y2}N^{+}=C(NR_{y3}R_{y4})NR_{y5}R_{y6}X^{-}$

In formulae (Y-a), (Y-b) and (Y-c), $X^{-}$ represents an anion for neutralizing electric charge, e.g., a halide ion (e.g., $Cl^{-}$, $Br^{-}$, $I^{-}$, etc.), $SCN^{-}$, $BF_{4}^{-}$, $PF_{6}^{-}$, $ClO_{4}^{-}$, $(CF_{3}SO_{2})_{2}N^{-}$, $(CF_{3}CF_{2}SO_{2})_{2}N^{-}$, $CF_{3}SO_{3}^{-}$, $CF_{3}COO^{-}$, $Ph_{4}B^{-}$, and $(CF_{3}SO_{2})_{3}C^{-}$ are exemplified as preferred examples, and $(CF_{3}SO_{2})_{2}N^{-}$, $PF_{6}^{-}$ and $BF_{4}^{-}$ are more preferred.

In formula (Y-a), $Q_{y1}$ represents an atomic group capable of forming a 5- or 6-membered aromatic cation with a nitrogen atom. It is preferred that $Q_{y1}$ is constituted with one or more atoms selected from the group consisting of a carbon atom, a hydrogen atom, a nitrogen atom, an oxygen atom and a sulfur atom.

The 5-membered ring formed by $Q_{y1}$ is preferably an oxazole ring, a thiazole ring, an imidazole ring, a pyrazole ring, an isooxazole ring, a thiadiazole ring, an oxadiazole ring or a triazole ring, more preferably an oxazole ring, a thiazole ring or an imidazole ring, and especially preferably an oxazole ring or an imidazole ring. The 6-membered ring formed by $Q_{y1}$ is preferably a pyridine ring, a pyrimidine ring, a pyridazine ring, a pyrazine ring or a triazine ring, and more preferably a pyridine ring.

In formula (Y-b), $A_{y1}$ represents a nitrogen atom or a phosphorus atom.

In formulae (Y-a), (Y-b) and (Y-c), $R_{y1}$ to $R_{y6}$ each represents a substituted or unsubstituted alkyl group (preferably an alkyl group having from 1 to 24 carbon atoms, which may be straight chain, branched or cyclic, e.g., methyl, ethyl, propyl, isopropyl, pentyl, hexyl, octyl, 2-ethylhexyl, t-octyl, decyl, dodecyl, tetradecyl, 2-hexyldecyl, octadecyl, cyclohexyl, cyclopentyl, etc.), or a substituted or unsubstituted alkenyl group (preferably an alkenyl group having from 2 to 24 carbon atoms, which may be straight chain or branched, e.g., vinyl, allyl, etc.), more preferably an alkyl group having from 2 to 18 carbon atoms or an alkenyl group having from 2 to 18 carbon atoms, and especially preferably an alkyl group having from 2 to 6 carbon atoms.

Further, in formula (Y-b), two or more of $R_{y1}$ to $R_{y3}$ may be linked to each other to form a non-aromatic ring containing $A_{y1}$ and in formula (Y-c), two or more of $R_{y1}$ to $R_{y6}$ may be linked to each other to form a cyclic structure.

In formulae (Y-a), (Y-b) and (Y-c), $Q_{y1}$ and $R_{y1}$ to $R_{y3}$ may each have a substituent, and the preferred examples of the substituents include a halogen atom (e.g., F, Cl, Br, I, etc.), a cyano group, an alkoxyl group (e.g., methoxy, ethoxy, etc.), an aryloxy group (e.g., phenoxy, etc.), an alkylthio group (e.g., methylthio, ethylthio, etc.), an alkoxycarbonyl group (e.g., ethoxycarbonyl, etc.), a carbonic acid ester group (e.g., ethoxycarbonyloxy, etc.), an acyl group (e.g., acetyl, propionyl, benzoyl, etc.), a sulfonyl group (e.g., methanesulfonyl, benzenesulfonyl, etc.), an acyloxy group (e.g., acetoxy, benzoyloxy, etc.), a sulfonyloxy group (e.g., methanesulfonyloxy, toluenesulfonyloxy, etc.), a phosphonyl group (e.g., diethylphosphonyl, etc.), an amido group (e.g., acetylamino, benzoylamino, etc.), a carbamoyl group (e.g., N,N-dimethylcarbamoyl, etc.), an alkyl group (e.g., methyl, ethyl, propyl, isopropyl, cyclopropyl, butyl, 2-carboxyethyl, benzyl, etc.), an aryl group (e.g., phenyl, toluyl, etc.), a heterocyclic group (e.g., pyridyl, imidazolyl, furanyl, etc.), and an alkenyl group (e.g., vinyl, 1-propenyl, etc.).

The compounds represented by formula (Y-a), (Y-b) or (Y-c) may form high polymeric substances via $Q_{y1}$ or $R_{y1}$ to $R_{y6}$.

Of these ionic liquids, ionic liquids having an aromatic group are preferred for their high affinity with dyes, and of the ionic liquids represented by formula (Y-a), those having an imidazolium or pyridinium skeleton are preferred.

Besides the specific examples of the ionic liquids preferably used in the invention described in patent JP-A-2001-167808 and JP-A-2002-75470, the following compounds are exemplified, but the invention is not limited to these compounds.

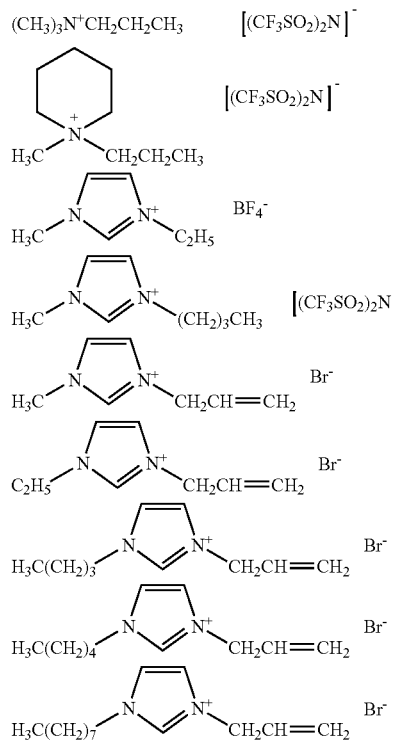

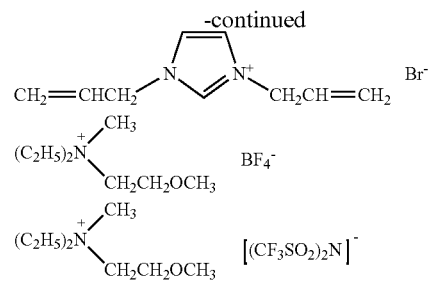

The dye compositions in the invention can be obtained by blending the above non-aqueous dyes and ionic liquids, but for the purpose of heightening the operability of a dyeing process, e.g., application, it is preferred that the non-aqueous dyes are dissolved in ionic liquids or dispersed in ionic liquids as fine particles. In such dissolution or dispersion, it is preferred for the mixture to be thoroughly stirred. As the stirring means, it is effective to grind the mixture in a mortar besides the use of various kinds of stirrers and dispersers such as a ball mill.

It is sufficient for the dye composition of the invention to contain at least one kind of non-aqueous dye, but may contain two or more kinds of non-aqueous dyes, and may further contain water-soluble dyes and pigments. It is sufficient for the dye composition of the invention to contain at least one kind of an ionic liquid, but may contain two or more kinds of ionic liquids.

A nonvolatile component may be added to the dye composition of the invention besides the non-aqueous dye and ionic liquid.

A dyeing method with the dye composition of the invention comprises a process of applying the dye composition to an object to be dyed, and a process of removing the fluidity of the applied dye composition to thereby complete dyeing.

As methods of applying the dye composition of the invention to an object, various methods can be used, e.g., an object substance to be dyed may be immersed in the liquid of dye composition, the dye composition may be merely poured on the object with a syringe or an injector, and at this time the dye composition may be poured while rotating the object with a spin coater, the dye composition may be applied to the top of a rod or a spurtle and stuck to the object, the dye composition may be adhered by coating with a brush or by printing means, the dye composition may be sprayed by ink jet or with an air brush, the viscosity of the dye composition is adjusted and may be coated by using an air doctor coater, a plate coater, an air knife coater, a squeeze coater, an immersion coater, a reverse roll coater, a transfer roll coater, a gravure coater, a kiss coater, a cast coater, a spray coater, a rod coater, a positive rotational roll coater, a curtain coater, an extrusion coater, a bar coater, or a drip coater, and methods other than these methods. The specific explanation of applications is described in detail, e.g., in *Coating Kogaku (Coating Engineering)*, pp. 253 to 277, Asakura Publishing Co. (Mar. 20, 1971). The order of coating of coating solutions can be arbitrarily selected, and if necessary, corona discharge treatment may be performed before coating of a desired coating solution for the purpose of increasing the adhesion with an undercoat layer or a support. When it is desired to constitute a dye layer with multilayers structure, simultaneous multilayer coating or successive multilayer coating can be done. These methods are disclosed, e.g., in JP-A-57-123532, JP-B-62-37451, JP-A-59-142741 and JP-A-59-165239.

For removing the fluidity of the dye composition, a method of merely wiping off the ionic liquid that is the cause of the fluidity, a method of absorbing the ionic liquid with paper or porous substances, and a method of washing out the ionic liquid with water or an aqueous solution are used.

As other method, a method of varying the ionic liquid spontaneously to a solid dye by ion exchange with the counter ions of the dye or other ions constituting the coexisting salts is used.

EXAMPLES

A dye composition and dyeing method of the invention will be described with reference to examples of the preparation of cyanine dye compositions and the dyeing method using the same. The materials, amounts, ratios of the component, processes and procedures can be arbitrarily changed without departing from the spirit and scope of the invention. Accordingly, the invention is not limited to the following examples.

Example 1

Brownish green liquid slurry was obtained by adding a few drops of an ionic liquid, which is 1-ethyl-3-methylimidazolium trifluoromethanesulfonate (ionic liquid A, manufactured by Kanto Chemical Co., Inc.), to 5 mg of exemplified dye S-1, that is, 5-chloro-2-[7-(5-chloro-1,3-dihydro-1,3,3-trimethyl-2H-indo-2-ylidene)hepta-1,3,5-trie nyl]-1,3,3-trimethyl-3H-indolium hexafluorophosphate (the synthesis example of the compound is described in *Nippon Shashin Gakkaishi* (*The Bulletin of Japan Institute of Photography*), Vol. 66, No. 6, pp. 597-600 (2003)), and grinding the mixture for 5 minutes in an agate mortar. The obtained slurry was coated with a spatula to (1) a filter, (2) an aluminum foil, (3) a polyvinylidene chloride film, and (4) clay plate respectively (dyeing processes). (1) A filter was washed with flowing water and then air-dried. Blotting and decolorization of the coated pattern by washing was not observed, and it was seen that the dye was fixed on the filter, and the filter was firmly dyed. The filter was pressed against (2) an aluminum foil and (3) a polyvinylidene chloride film to make them absorb the ionic liquid, and dried (2) and (3), as a result, the dye was adhered to (2) and (3) in a film state. Decolorization of the dye was not observed by washing the samples, so that it was confirmed that the samples were firmly dyed. In the case of (4) clay plate, the liquid was absorbed just after coating the dye composition, and the dye was fixed in a uniform film state on the surface of (4) clay plate.

Example 2

Dark blue slurry was obtained in the same manner as in Example 1, except that exemplified dye S-2, nonmetal phthalocyanine, was used in place of exemplified dye S-1, and dyeing process was performed in the same manner as in Example 1. The dyeing results are shown in Table 1.

Example 3

Red slurry was obtained in the same manner as in Example 1, except that exemplified dye S-3, Rhodamine 6G was used in place of exemplified dye S-1, and dyeing process was performed in the same manner as in Example 1. The dyeing results are shown in Table 1.

Example 4

Yellow slurry was obtained in the same manner as in Example 1, except that exemplified dye S-4, Bromophenol Blue, was used in place of exemplified dye S-1, and dyeing process was performed in the same manner as in Example 1. The dyeing results are shown in Table 1.

Example 5

Orange slurry was obtained in the same manner as in Example 1, except that exemplified dye S-5, Sudan Orange (4-(phenylazo)resorcin), was used in place of exemplified dye S-1, and dyeing process was performed in the same manner as in Example 1. The dyeing results are shown in Table 1.

Example 6

Yellow slurry was obtained in the same manner as in Example 1, except that exemplified dye S-6, azo dye, was used in place of exemplified dye S-1, and dyeing process was performed in the same manner as in Example 1. The dyeing results are shown in Table 1.

Example 7

Brown slurry was obtained in the same manner as in Example 1, except that exemplified dye S-7, oxonol dye, was used in place of exemplified dye S-1, and dyeing process was performed in the same manner as in Example 1. The dyeing results are shown in Table 1.

Example 8

Purple slurry was obtained in the same manner as in Example 1, except that exemplified dye S-8, azomethine dye, was used in place of exemplified dye S-1, and dyeing process was performed in the same manner as in Example 1. The dyeing results are shown in Table 1.

Example 9

Glossy green slurry was obtained in the same manner as in Example 1, except that N,N-diethyl-N-methyl-N-(2-methoxyethyl)ammonium bis(trifluoromethanesulfonyl)imide (ionic liquid B) was used in place of 1-ethyl-3-methyl-imidazolium trifluoromethanesulfonate (ionic liquid A), and dyeing process was performed in the same manner as in Example 1. The dyeing results are shown in Table 1.

Example 10

Dark blue slurry was obtained in the same manner as in Example 9, except that exemplified dye S-2, nonmetal phthalocyanine, was used in place of exemplified dye S-1 in Example 9, and dyeing process was performed in the same manner as in Example 1. The dyeing results are shown in Table 1.

Example 11

Dark red slurry was obtained in the same manner as in Example 9, except that exemplified dye S-3, Rhodamine 6G was used in place of exemplified dye S-1 in Example 9, and dyeing process was performed in the same manner as in Example 1. The dyeing results are shown in Table 1.

Example 12

Pale yellow slurry was obtained in the same manner as in Example 9, except that exemplified dye S-4, Bromophenol Blue, was used in place of exemplified dye S-1 in Example 9, and dyeing process was performed in the same manner as in Example 1. The dyeing results are shown in Table 1.

Example 13

Reddish orange slurry was obtained in the same manner as in Example 9, except that exemplified dye S-5, Sudan Orange (4-(phenylazo)resorcin), was used in place of exemplified dye S-1 in Example 9, and dyeing process was performed in the same manner as in Example 1. The dyeing results are shown in Table 1.

Example 14

Yellow slurry was obtained in the same manner as in Example 9, except that exemplified dye S-6, azo dye, was used in place of exemplified dye S-1 in Example 9, and dyeing process was performed in the same manner as in Example 1. The dyeing results are shown in Table 1.

Example 15

Brown slurry was obtained in the same manner as in Example 9, except that exemplified dye S-7, oxonol dye, was used in place of exemplified dye S-1 in Example 9, and dyeing process was performed in the same manner as in Example 1. The dyeing results are shown in Table 1.

Example 16

Dark purple slurry was obtained in the same manner as in Example 9, except that exemplified dye S-8, azomethine dye, was used in place of exemplified dye S-1 in Example 9, and dyeing process was performed in the same manner as in Example 1. The dyeing results are shown in Table 1.

Comparative Example

In this comparative example, water was used in place of the ionic liquid.

The same procedure as in the above examples was repeated by using distilled water in place of ionic liquids, but slurry could not be obtained by grinding the mixture in an agate mortar, and fine crystals of the dye precipitated at the bottom of the water, so that every dye in the above examples could not be coated.

TABLE 1

| Example No. | Dye | Ionic Liquid | Filter | Cotton Cloth | Aluminum Foil | Polyvinylidene Chloride Film | Clay Plate |
|---|---|---|---|---|---|---|---|
| 1 | S-1 | A | Green | Green | Green | Green | Green |
| 2 | S-2 | A | Dark blue | Dark blue | Dark blue | Dark blue | Dark blue |
| 3 | S-3 | A | Purplish red | Purplish red | Purplish red | Purplish red | Purplish red |
| 4 | S-4 | A | Yellow # | Yellow # | Yellow # | Yellow # | Yellow |
| 5 | S-5 | A | Brown | Brown | Brown | Brown | Brown |
| 6 | S-6 | A | Yellow | Yellow | Yellow | Yellow | Yellow |
| 7 | S-7 | A | Brown | Brown | Brown | Brown | Brown |
| 8 | S-8 | A | Dark purple | Dark purple | Dark purple | Dark purple | Dark purple |
| 9 | S-1 | B | Green * | Green * | Green * | Green * | Green |
| 10 | S-2 | B | Dark blue | Dark blue | Dark blue | Dark blue | Dark blue |
| 11 | S-3 | B | Red * | Red * | Red * | Red * | Red |
| 12 | S-4 | B | Pale yellow | Pale yellow | Pale yellow | Pale yellow | Pale yellow |
| 13 | S-5 | B | Brown | Brown | Brown | Brown | Brown |
| 14 | S-6 | B | Yellow | Yellow | Yellow | Yellow | Yellow |
| 15 | S-7 | B | Brown | Brown | Brown | Brown | Brown |
| 16 | S-8 | B | Dark purple | Dark purple | Dark purple | Dark purple | Dark purple |

* Dye peeled off after water washing.
Blotting of blue was observed.

From the results of the evaluations of the Examples and Comparative Example shown in Table 1, it can be seen that non-aqueous dyes can be coated and dyed by using ionic liquids without using a volatile organic solvent.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-65615 and JP2005-208978, filed Mar. 9 and Jul. 19 of 2005, respectively, the contents of which is incorporated herein by reference.

What is claimed is:

1. A dye composition comprising: a non-aqueous dye; and an ionic liquid wherein the non-aqueous dye is a polymethine dye comprising a cyanine dye, a merocyanine dye or an oxanol dye, and wherein the cyanine dye is represented by formula (I):

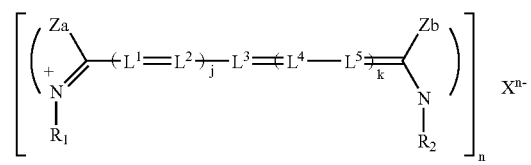

wherein Za and Zb each independently represents an atomic group necessary to form a 5- or 6-membered nitrogen-containing heterocyclic ring; $R_1$ and $R_2$ each independently represents an alkyl group or an aryl group; $L^1$, $L^2$, $L^3$, $L^4$ and $L^5$ each independently represents a substituted or unsubstituted methine group, provided that when there are substituents on $L^1$ to $L^5$, the substituents may be linked to each other to form a ring; j represents 0, 1 or 2; k represents 0 or 1; $X^{n-}$ represents an n-valent anion; and n represents an integer of 1 or more.

2. The dye composition according to claim 1, wherein the non-aqueous dye is a salt of one of a dye cation and a dye anion.

3. The dye composition according to claim 1, wherein the non-aqueous dye is an oxonol dye represented by one of formulae (II-1) and (II-2):

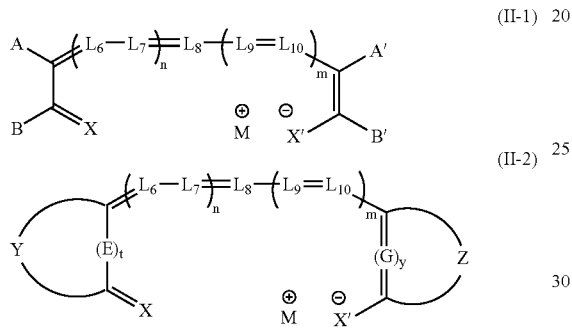

wherein A, A', B and B' each independently represents a substituent; Y and Z each independently represents an atomic group necessary to form a carbon ring or a heterocyclic ring; E and G each independently represents an atomic group to form a conjugated double bond chain; X and X' each independently represents an oxygen atom, a nitrogen atom or $C(CN)_2$; $L_6$, $L_7$, $L_8$, $L_9$ and $L_{10}$ each independently represents a methine group, which may be substituted; $M^+$ represents an onium ion; m and n each independently represents 0, 1 or 2; and t and y each independently represents 0 or 1.

4. The dye composition according to claim 1, wherein the ionic liquid comprises an ion having one of an aromatic group and a hetero-aromatic group.

5. The dye composition according to claim 1, wherein the ionic liquid is represented by one of formulae (Y-a), (Y-b) and (Y-c):

(Y-a):

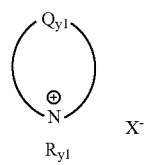

(Y-b): $R_{y1}R_{y2}R_{y3}A_{y1}^+ X^-$ (Y-c): $R_{y1}R_{y2}N^+=C(NR_{y3}R_{y4})NR_{y5}R_{y6} X^-$ wherein $R_{y1}$ to $R_{y6}$ each independently represents a substituted or unsubstituted alkyl group, or a substituted or unsubstituted alkenyl group; $X^-$ represents an anion for neutralizing electric charge; $Q_{y1}$ represents an atomic group capable of forming a 5- or 6-membered aromatic cation with a nitrogen atom; and $A_{y1}$ represents a nitrogen atom or a phosphorus atom.

6. The dye composition according to claim 1, wherein
the ionic liquid comprises an ion having one of an aromatic group and a hetero-aromatic group; and
the non-aqueous dye is a cyanine dye represented by formula (I):

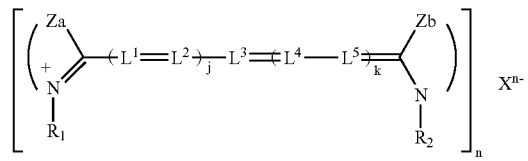

wherein Za and Zb each independently represents an atomic group necessary to form a 5- or 6-membered nitrogen-containing heterocyclic ring; $R_1$ and $R_2$ each independently represents an alkyl group or an aryl group; $L^1$, $L^2$, $L^3$, $L^4$ and $L^5$ each independently represents a substituted or unsubstituted methine group, provided that when there are substituents on $L^1$ to $L^5$, the substituents may be linked to each other to form a ring; j represents 0, 1 or 2; k represents 0 or 1; $X^{n-}$ represents an n-valent anion; and n represents an integer of 1 or more.

7. The dye composition according to claim 1, wherein
the ionic liquid comprises an ion having one of an aromatic group and a hetero-aromatic group;
and the non-aqueous dye is an oxonol dye represented by one of formulae (II-1) and (II-2):

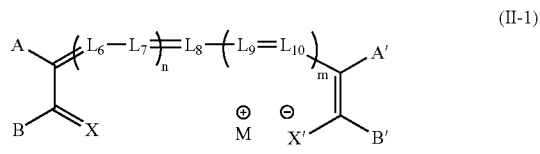

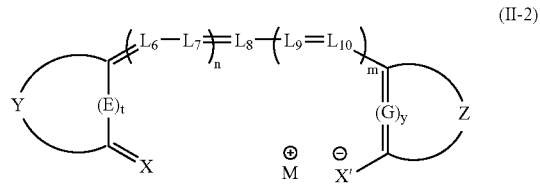

wherein A, A', B and B' each independently represents a substituent; Y and Z each independently represents an atomic group necessary to form a carbon ring or a heterocyclic ring; E and G each independently represents an atomic group to form a conjugated double bond chain; X and X' each independently represents an oxygen atom, a nitrogen atom or $C(CN)_2$; $L_6$, $L_7$, $L_8$, $L_9$ and $L_{10}$ each independently represents a methine group, which may be substituted; $M^+$ represents an onium ion; m and n each independently represents 0, 1 or 2; and t and y each independently represents 0 or 1.

8. The dye composition according to claim 1, wherein the non-aqueous dye is a cyanine dye represented by formula (I):

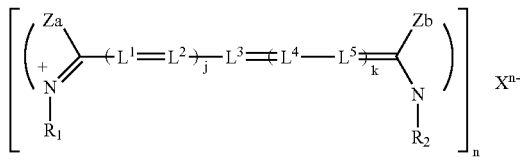

wherein Za and Zb each independently represents an atomic group necessary to form a 5- or 6-membered nitrogen-containing heterocyclic ring; $R_1$ and $R_2$ each independently represents an alkyl group or an aryl group; $L^1$, $L^2$, $L^3$, $L^4$ and $L^5$ each independently represents a substituted or unsubstituted methine group, provided that when there are substituents on $L^1$ to $L^5$, the substituents may be linked to each other to form a ring; j represents 0, 1 or 2; k represents 0 or 1; $X^{n-}$ represents an n-valent anion; and n represents an integer of 1 or more; and the ionic liquid is represented by one of formulae (Y-a), (Y-b) and (Y-c):

(Y-a):

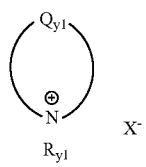

(Y-b): $R_{y1}R_{y2}R_{y3}A_{y1}^+ X^-$
(Y-c): $R_{y1}R_{y2}N^+=C(NR_{y3}R_{y4})NR_{y5}R_{y6} X^-$ wherein $R_{y1}$ to $R_6$ each independently represents a substituted or unsubstituted alkyl group, or a substituted or unsubstituted alkenyl group; $X^-$ represents an anion for neutralizing electric charge; $Q_{y1}$ represents an atomic group capable of forming a 5- or 6-membered aromatic cation with a nitrogen atom; and $A_{y1}$ represents a nitrogen atom or a phosphorus atom.

9. The dye composition according to claim 1, wherein the non-aqueous dye is an oxonol dye represented by one of formulae (II-1) and (II-2):

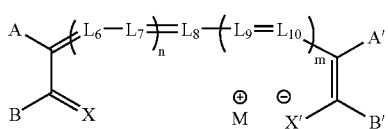

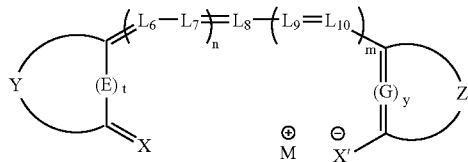

wherein A, A', B and B' each independently represents a substituent; Y and Z each independently represents an atomic group necessary to form a carbon ring or a heterocyclic ring; E and G each independently represents an atomic group to form a conjugated double bond chain; X and X' each independently represents an oxygen atom, a nitrogen atom or $C(CN)_2$; $L_6$, $L_7$, $L_8$, $L_9$ and $L_{10}$ each independently represents a methine group, which may be substituted; $M^+$ represents an onium ion; m and n each independently represents 0, 1 or 2; and t and y each independently represents 0 or 1; and the ionic liquid is represented by one of formulae (Y-a), (Y-b) and (Y-c):

(Y-a):

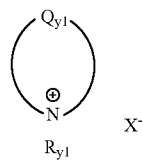

(Y-b): $R_{y1}R_{y2}R_{y3}A_{y1}^+ X^-$
(Y-c): $R_{y1}R_{y2}N^+=C(NR_{y3}R_{y4})NR_{y5}R_{y6} X^-$ wherein $R_{y1}$ to $R_{y6}$ each independently represents a substituted or unsubstituted alkyl group, or a substituted or unsubstituted alkenyl group; $X^-$ represents an anion for neutralizing electric charge; $Q_{y1}$ represents an atomic group capable of forming a 5- or 6-membered aromatic cation with a nitrogen atom; and $A_{y1}$ represents a nitrogen atom or a phosphorus atom.

10. A dyeing method comprising:

applying a dye composition according to claim 1 to an object; and removing fluidity of the dye composition.

11. The dye composition of claim 1, wherein said composition does not contain a volatile organic solvent.

12. The dyeing method of claim 10, wherein said object is dyed without using a volatile organic solvent.

* * * * *